United States Patent
Liang et al.

(10) Patent No.: US 6,606,091 B2
(45) Date of Patent: Aug. 12, 2003

(54) SYSTEM FOR INTERACTIVE 3D OBJECT EXTRACTION FROM SLICE-BASED MEDICAL IMAGES

(75) Inventors: Cheng-Chung Liang, W. Windsor, NJ (US); Thomas Moeller, Berlin (DE)

(73) Assignee: Siemens Corporate Research, Inc., Princeton, NJ (US)

(*) Notice: Subject to any disclaimer, the term of this patent is extended or adjusted under 35 U.S.C. 154(b) by 250 days.

(21) Appl. No.: 09/777,531

(22) Filed: Feb. 6, 2001

(65) Prior Publication Data

US 2001/0033283 A1 Oct. 25, 2001

Related U.S. Application Data

(60) Provisional application No. 60/180,889, filed on Feb. 7, 2000.

(51) Int. Cl.$^7$ ................................................ G06T 17/00
(52) U.S. Cl. ................................................ 345/424
(58) Field of Search ................................ 345/419, 420, 345/424, 606, 753, 757, 848, 850, 851, 852

(56) References Cited

U.S. PATENT DOCUMENTS

| | | | |
|---|---|---|---|
| 4,710,876 A | 12/1987 | Cline et al. | 364/414 |
| 4,879,668 A | 11/1989 | Cline et al. | 364/522 |
| 5,544,283 A | 8/1996 | Kaufman et al. | 395/124 |

OTHER PUBLICATIONS

Gallagher "Computer Visualization" pp 107–119 1995.*
David Meyers and S. Skinner, "Surfaces from Contours," AMC Trans. On Graphics, 11:3, pp. 228–258, Jul. 1992.
Mortenson, E.N. et al., "Interactive Segmentation with Intelligent Scissors," Graphical Models and Image Processing, 60:, pp. 349–384, Sep. 1998.
Fujimura, K. et al., "Shape Reconstruction from Contours Using Isotopic Deformation," Graphical Models and Image Processing, 61:pp. 127–147, 1999.
J–D Boissonat, "Shape Reconstruction From planar Cross–Sections," Computer Vision Graphics and Image Processing, 44: 1988, 1–29.
W.–C. Lin, et al., "Dynamic Elastic Interpolation For 3D Medical Image Reconstruction From Serial Cross–Sections," IFEE, pp. 225–232, 1988.

(List continued on next page.)

Primary Examiner—Almis R. Jankus
(74) Attorney, Agent, or Firm—Donald B. Paschburg; Alexander J. Burke

(57) ABSTRACT

The present invention relates to a method and a system for extracting a 3D region of interest from a stack of medical scan slices which is still a challenging task even in this new millennium. One difficulty is that there is no robust automatic algorithm that can handle all the different situations and applications. Human intervention is usually unavoidable for extracting desired area or organs. However, without convenient tools, it is a tedious job for human being to go through hundred or thousand of slices just to extract region of interest. A system combines and modifies several advanced techniques to help a user extract volume of interest very easily and quickly. The technique of livewire for initial-delineate and modify regions of interest from 2D slices is utilized. Then variational interpolation technique is employed to derive a 3D shape from these delineated 2D contours. The 3D shape can be visualized as is or converted to a 3D solid for volume visualization or masking out of the undesirable parts of a data set.

34 Claims, 11 Drawing Sheets

OTHER PUBLICATIONS

Turk and O'Brien, "Shape Transformation Using Variation Implicit Functions," *The Proceedings pf ACM SIGGRAPH 99, Los Angeles, California*, pp. 335–342, Aug. 8–13.

F. Bernardini et al., "The Ball–pivoting Algorithm for Surface Reconstruction," *IEEE Trans. Visualization and Computer Graphics*, 5:4 349–359, Oct.–Dec. 1999.

E. Edelsbrunner et al., Three–dimension–alpha Shapes, *ACM Trans. Graph*, 13:1 pp. 43–72, Jan. 1994.

Duchon, Jean, "Splines Minimizing Rotation–Invariant Semi–Norms in Sobolev Spaces," *In Constructive Theory of functions of Several Variables, Lecture Notes in Mathematics, edited by A. Dolb and B. Eckmann, Springer–Verlag*, 1977, pp. 85–100.

Mikheev, Nozik et al., "Computation of Offset Curves by The Huygens Principle," *Computer Graphics Forum*, 13:4 pp. 249–252 (1994).

Flannery, Press, Teukolsky and Vetterling "Numerical Recipes in C," Cambridge University Press.

Bar–On, et al., "A Fast Parallel Cholesky Decomposition Algorithm For Tridiagonal Symmetric Matrices" *SIAM Journal on Matrix Analysis and Applications*, 18:2 pp. 403–418, 1997.

Bloomenthal, "An Implicit Surface Polygonizer," *Graphic Gems IV, edited by Heckbert, Academic Press*, pp. 324–349, 1994.

E. Hartmann, "A Marching Method for the Triangulation of Surfaces," *The Visual computer*, 14:95–108–109, Springer–Verlag 1998.

Neider, Davis and Woo, "OpenGL Programming Guide", Addison Wesley.

Kaufman, "3D Scan–Conversion Algorithms For Voxel–Based Graphics," *Interactive 3D Graphics*, Oct. 23–24, 1986, pp. 45–75.

Chen and Fang, "Fast Voxelization of Three–Dimensional Synthetic Objects," *ACM*, 99, 3:4 pp. 33–45.

* cited by examiner

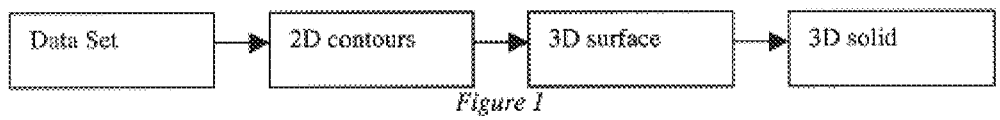
Figure 1
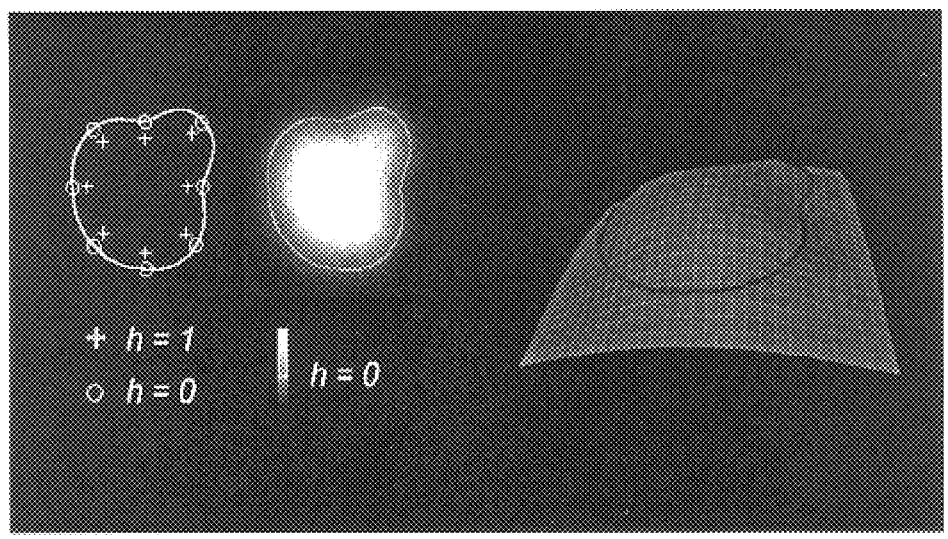
Figure 2: Constructing a smooth surface from a given collection of constraints
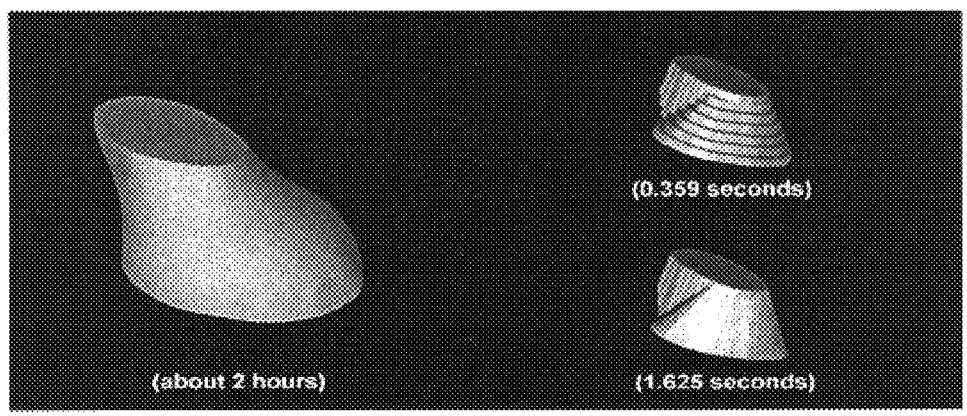
Figure 3: Interpolation using variational implicit functions (left) compared to offset shape transformation (right)

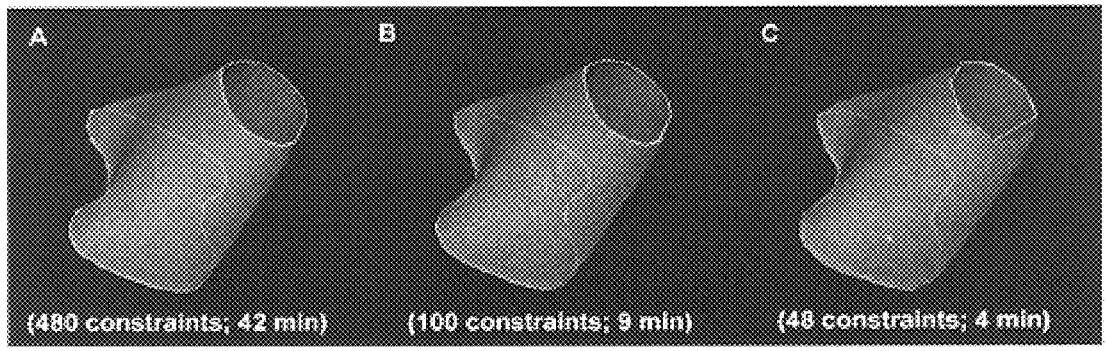
Figure 4: Interpolation output depending on the total number of constraints
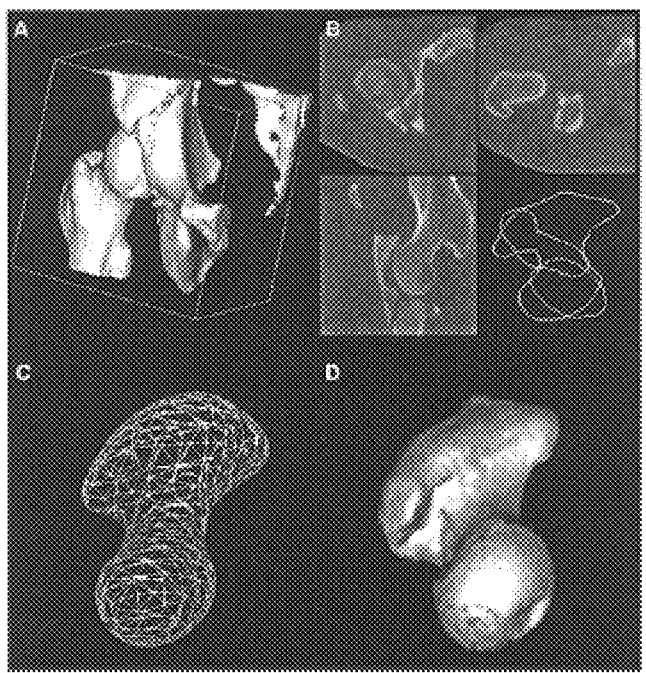
Figure 5: Reconstruction of 3d-objects using contours

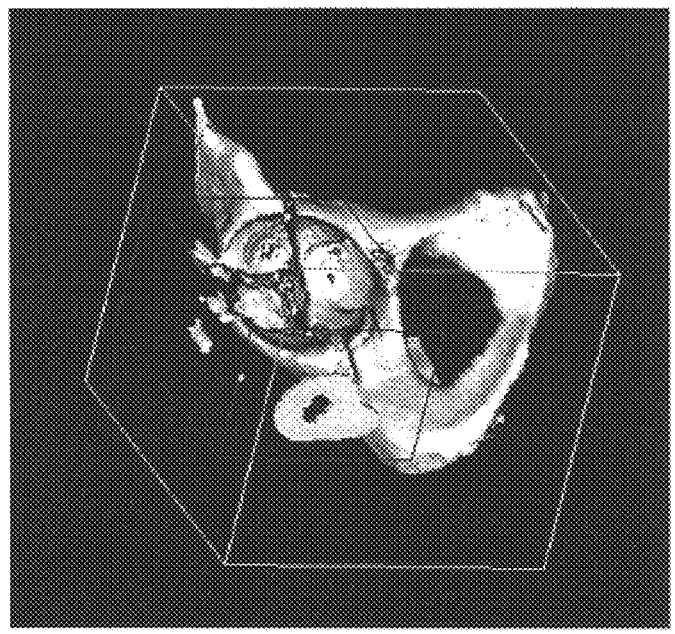
Figure 6: Masked acetabulum data in SSD-view (surface rendering)
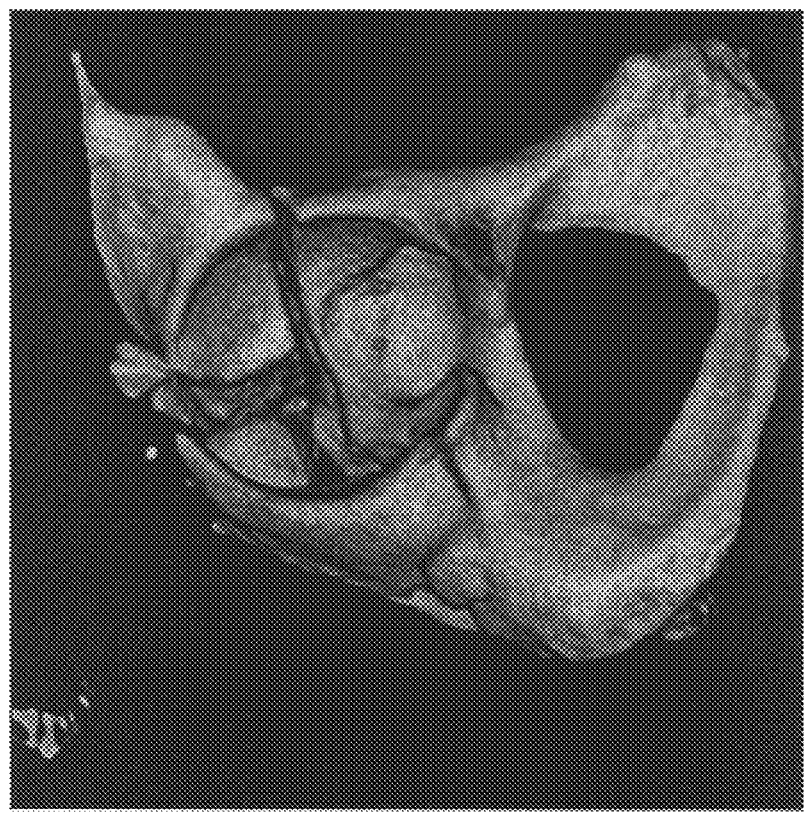
Figure 7: Masked acetabulum in VRT-view (volume rendering)

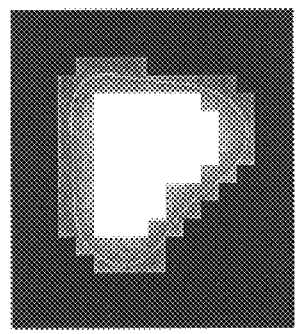
Figure 8: Skipping regions of no interest
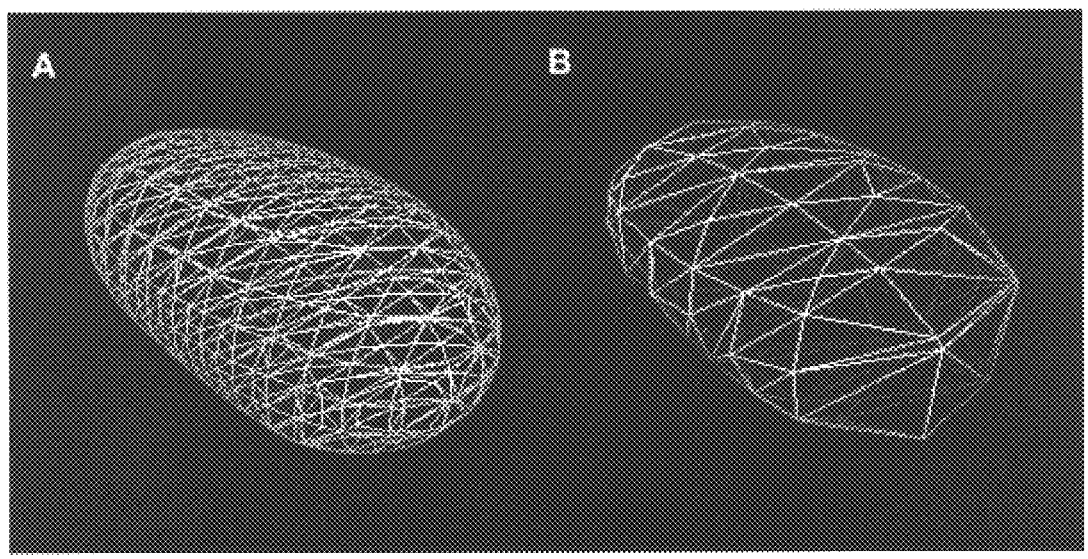
Figure 9: Polygonized object (size of triangles: 15 left, 50 right)

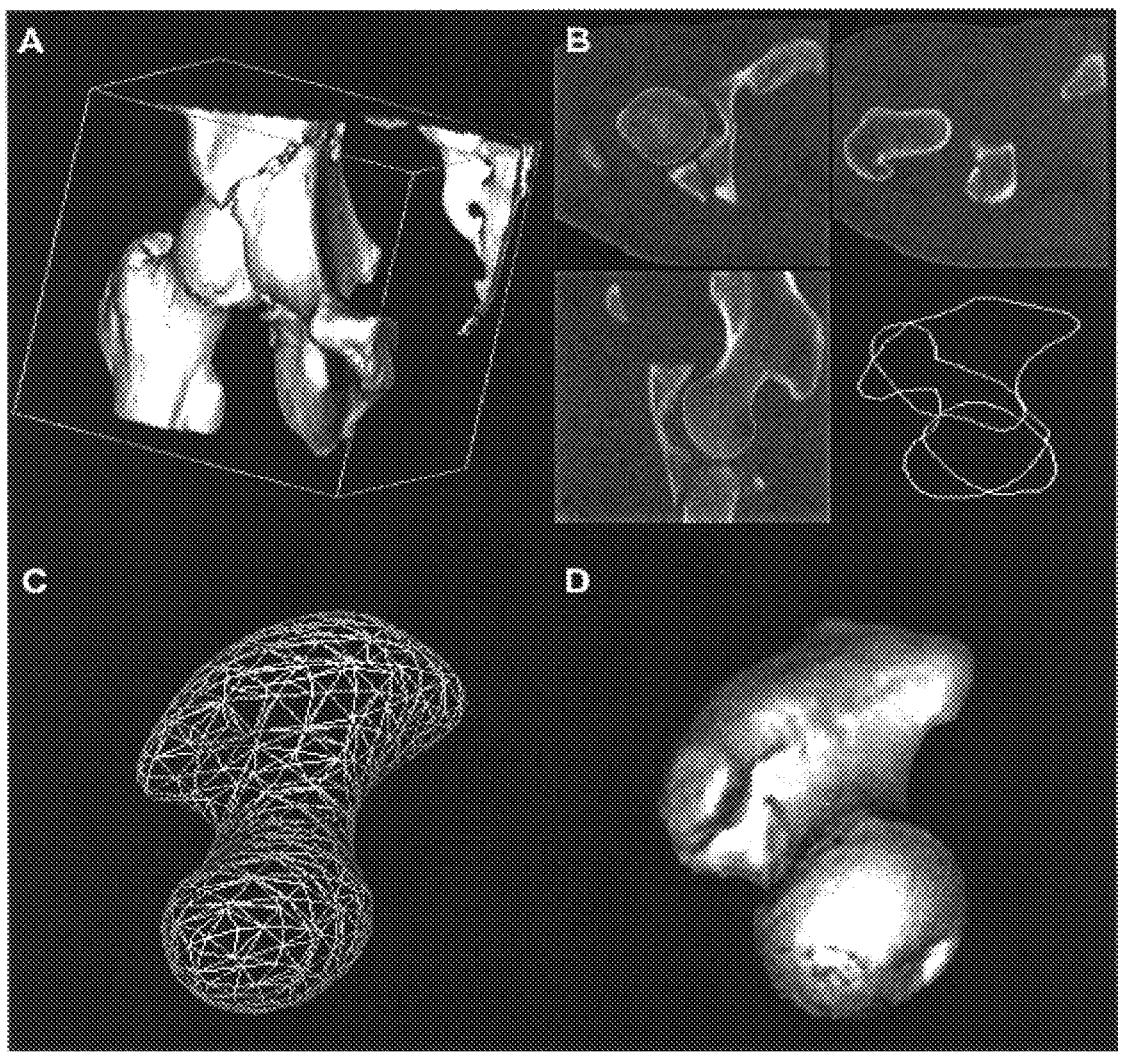
*Figure 10: Steps of converting that take place.*

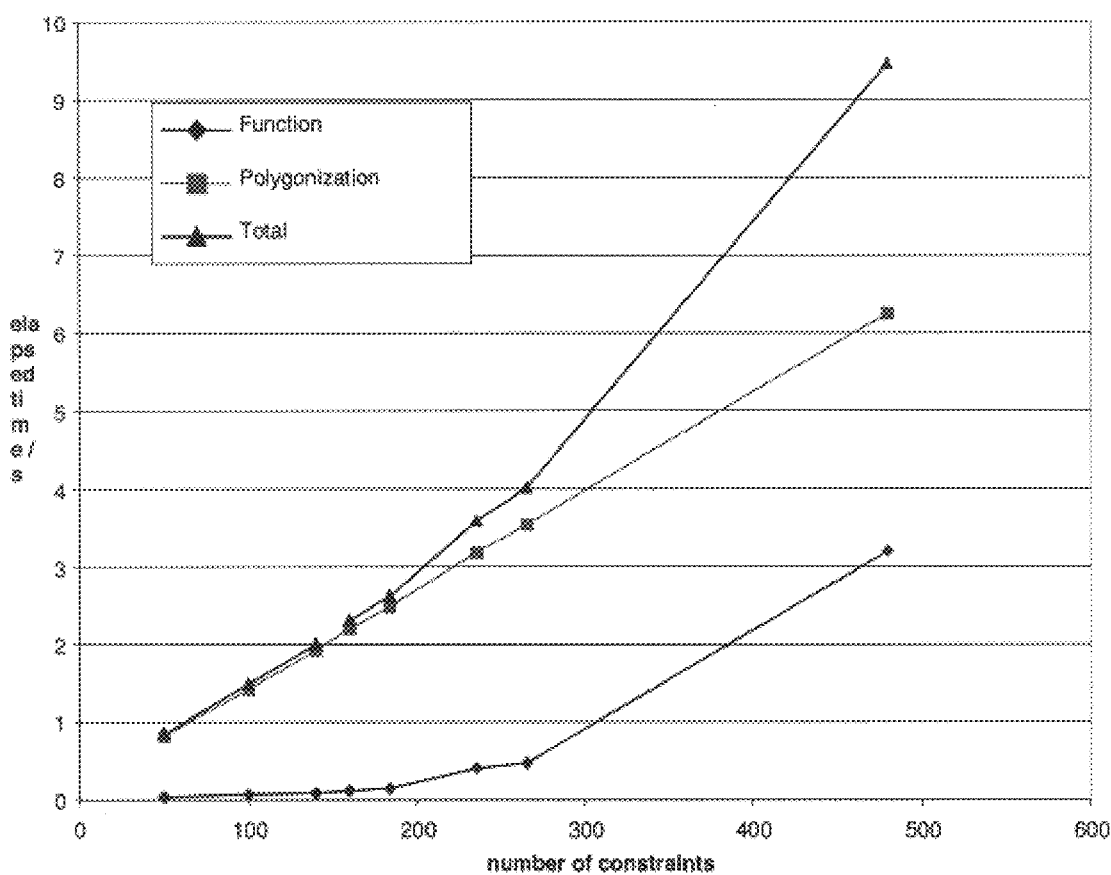
*Figure 11: Computation time for interpolation and polygonization*
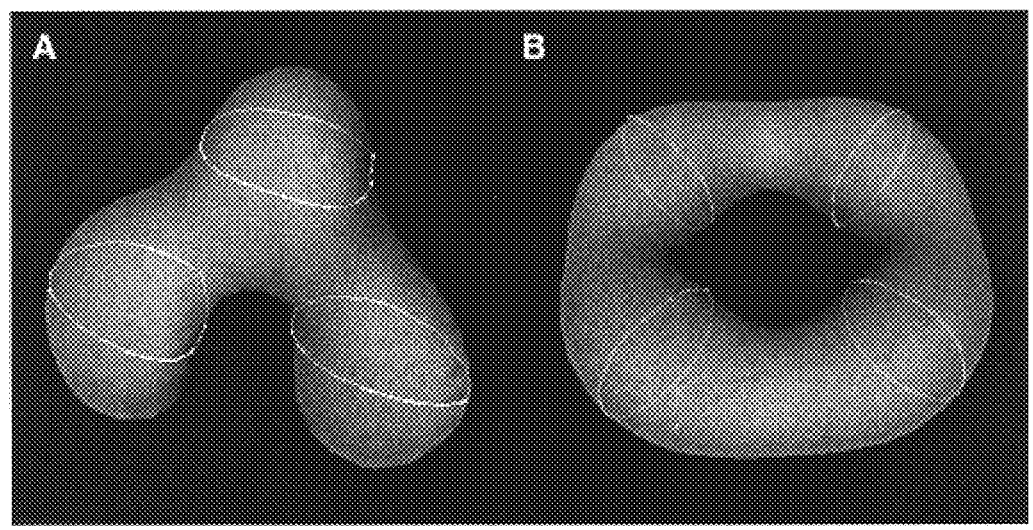
*Figure 12: Interpolation with multiple shapes and shapes in arbitrary angle*

25 — Shape reconstruction block

251 — For each contour point, assign a height value of 0; Find an accompanied point in its inner normal direction and assign a height value of 1.

252 — Use the interpolation function $f(x) = \sum_{j=1}^{n} d_j \phi(x - c_j) + P(x)$, And radial basis function $\phi(x) = |x|^2 \log(|x|)$, And position/height values of contour points and the accompanied points to construct a linear system $$\begin{bmatrix} \phi_{11} & \phi_{12} & \cdots & \phi_{1k} & 1 & c_1^x & c_1^y & c_1^z \\ \phi_{21} & \phi_{22} & \cdots & \phi_{2k} & 1 & c_2^x & c_2^y & c_2^z \\ \vdots & \vdots & & \vdots & \vdots & \vdots & \vdots & \vdots \\ \phi_{k1} & \phi_{k2} & \cdots & \phi_{kk} & 1 & c_k^x & c_k^y & c_k^z \\ 1 & 1 & \cdots & 1 & 0 & 0 & 0 & 0 \\ c_1^x & c_2^x & \cdots & c_k^x & 0 & 0 & 0 & 0 \\ c_1^y & c_2^y & \cdots & c_k^y & 0 & 0 & 0 & 0 \\ c_1^z & c_2^z & \cdots & c_k^z & 0 & 0 & 0 & 0 \end{bmatrix} \begin{bmatrix} d_1 \\ d_2 \\ \vdots \\ d_k \\ p_0 \\ p_1 \\ p_2 \\ p_3 \end{bmatrix} = \begin{bmatrix} h_1 \\ h_2 \\ \vdots \\ h_k \\ 0 \\ 0 \\ 0 \\ 0 \end{bmatrix}$$

253 — Solve this linear system using LU decomposition to get $$\begin{bmatrix} d_1 \\ d_2 \\ \vdots \\ d_k \\ p_0 \\ p_1 \\ p_2 \\ p_3 \end{bmatrix}$$

Figure 13C

SYSTEM FOR INTERACTIVE 3D OBJECT EXTRACTION FROM SLICE-BASED MEDICAL IMAGES

RELATED APPLICATIONS

The present application is a continuation in part application of U.S. Provisional patent application Ser. No. 60/180,889 filed on Feb. 7, 2000 and claiming priority thereto pursuant to 37 C.F.R. 1.120.

BACKGROUND OF THE INVENTION

1. Field of the Invention

The present invention relates to a method and a system for extracting, adding and/or otherwise manipulating a three dimensional (3D) region of interest from a stack of two dimensional scan slices. In particular, the present invention provides a method and an apparatus for obtaining a 3 D shape for visualization either as is or for volume visualization by masking out undesirable parts of a data set stored in two dimensional scan slices such as a stack of medical scan slices.

2. Description of the Related Art

To extract a three-dimensional (3D) region of interest from a stack of medical scan slices is still a challenging task nowadays. The main difficulty is that there is no robust automatic algorithm that can handle all the different situations and applications. When automatic methods fail, human intervention is usually unavoidable for extracting desired area or regions of interest. However, without convenient tools, it is a tedious job for human being to go through hundred or thousand of slices just to extract regions of interest. A 3D shape can be reconstructed from these contours using various methods. There are several ways to use the reconstructed 3D shape. It can be visualized as is. It can be used as spatial rendering attributes in volume visualization. It can be used as a mask to remove unwanted parts from a data set and reveal obscured portion of the data set.

A general flow of a typical application is shown in FIG. 1.

There are plenty of algorithms for each of the steps. However, it would be desirable to find algorithms that can overcome the following limitations and provide users with a robust tool for the extraction.

Since in medical domain applications, the data usually is in the form of parallel slices based on the medical scan devices. The regions of interest are outlined as 2D contours from these slices using various automatic or interactive methods. This leads to approaches for reconstructing 3D objects based on these series of parallel 2D contours. There are lots of research papers dealing with this problem. Most of the approaches use triangular tilting but have to deal with various correspondence problems, branching problems, and the tiling problems [1].

Sometimes, the most significant features are not revealed in the direction of the parallel slices but in other directions. It is to the best of user interactive efficiency and shape fidelity if the user can outline the significant features along that direction. However, there are very few methods that can handle non-parallel contour surface reconstruction.

Another important factor to the success of 3D object extraction is interactivity. A user requires quick visual feedback to correct some mistakes or add more contours in contour drawing stage. To achieve interactive speed for quick updating and adjusting of the whole process is also a very challenging job.

It is therefore desirable to combine and modify several advanced techniques to help user extract volume of interest very easily and quickly.

SUMMARY OF THE INVENTION

It is therefore an object of the present invention to provide a method and a system for more rapidly developing 3D shapes from two dimensional scan slices for (1) visualization; (20) removal of obscuring portions of the two dimensional data set e.g. scan slices, in order to better visualize the remaining data set as a 3D image; and (3) to permit repetition of this process in order to refine the quality of the produced 3 D shape.

It is another object of the present invention to provide a 3D shape of organs and body parts that is faster to produce particularly when required during medical procedures and that produces by better resolution through repetition by repeating the process in a faster time interval then is currently available.

It is yet another object of the present invention to utilize livewire techniques, shape reconstruction techniques including variation interpolate techniques to more rapidly derive 3D shapes from 2D scan slices and from delineated 2D contours.

Other objects of the present invention will become apparent from the foregoing drawings and description.

BRIEF DESCRIPTION OF THE DRAWINGS

FIG. 1 is a block diagram of a typical application for obtaining a 3D shape;

FIG. 2 is a diagram showing the construction of a smooth surface from a collection of constraint points having scalar height values;

FIG. 3 illustrates interpolation utilizing variation implicit functions;

FIGS. 4 A–C illustrates interpolation based on the total number of constraint points in accordance with the teaching of the present invention;

FIGS. 5A–D illustrates how to reconstruct 3D objects using contours according to the present invention;

FIG. 6 illustrates a surface rendering of the reconstructed object illustrating loss of accuracy;

FIG. 7 illustrates a volume rendering of the 3D object applying a transforming value to each voxel according to the present invention;

FIG. 8 illustrates how the present invention can skip areas that are of no interest to speed up the reconstruction;

FIGS. 9A–B illustrates the surface polygonal of an object according to the present invention;

FIGS. 10A–D illustrates the steps of converting an image to a 3D object according to the present invention;

FIG. 11 is a graph showing computer times for interpolation and polygonalization;

FIGS. 12A–B illustrate interpolation with multiple shapes and shapes in an arbitrary angle; and FIGS. 13A–E illustrate flow charts of the present invention including:

FIG. 13A is a general flow in accordance with the present invention; and

FIGS. 13B–E are detailed flow charts of the blocks: live wire (FIG. 13B); Shape Reconstruction (FIG. 13C); Surface Polygonization (FIG. 13D); and Voxelization (FIG. 13E in accordance with the present invention.

DETAILED DESCRIPTION OF THE PREFERRED EMBODIMENTS

Figure 13A:
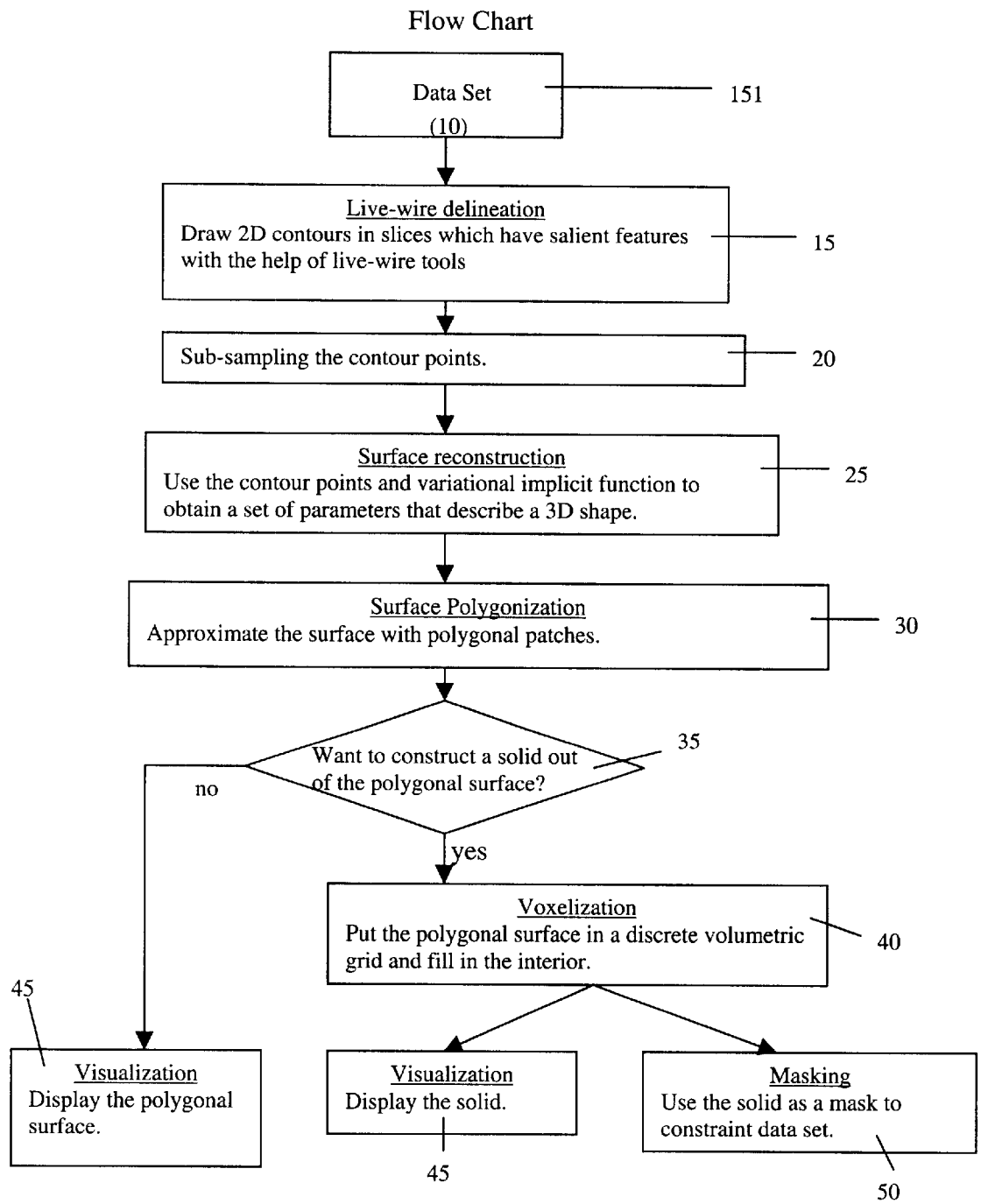

Reference is made to the drawings of FIGS. 1–13E, in which FIGS. 13A–13E are flow charts of the present invention. As illustrated in FIG. 13A, the general flow chart of the present invention, the present invention combines and modifies several advanced techniques to help user extract volume of interest very easily and quickly.

From 2D slices, the present invention employs the technique of livewire [2] for initial-delineate and modify regions of interest from 2D slices. Then the system and method of the present invention applies a variational interpolation technique to derive a 3D shape from these delineated 2D contours of the live wire techniques which are faster then known conventional techniques. This variational interpolation technique has the potential to overcome all the difficulties mentioned above and open up other application fields for the present invention.

Section 2 of the present application, provides a brief review of the existing algorithms for shape reconstruction. Livewire technique is described in section 3. Variational interpolation for shape reconstruction is described in section 4. The present invention's technique for speeding up the variational interpolation algorithm is provided in section 5 and include several examples.

2. Related Work

A shape reconstruction problem, depending on the distribution of the points or constraints, can either be from planar contours or from unorganized dense points.

2.1 Shape reconstruction from planar contours

Most existing approaches to shape reconstruction use triangular tiling to construct a 3D shape, where each triangular face is made of two consecutive vertices from one contour and one vertex taken from the other contour. See Fujimura and Kuo [3] describing more recent developments in their survey section of their paper.

Instead of using surface tiling, Boissonnat [4] used tetrahedralization of the space between two contours by using the Delaunary triangulation of a pair of successive contours.

Another approach is to interpolate several intermediate contours between a given pair of contours [5]. A 3D shape can be formed by stacking all the contours together or by using the above tiling again but to finer contour pairs. This approach is related to shape transformation problem as parametric correspondence approach. An entirely different approach to shape transformation is using implicit function interpolation, which is what we are going to use in this paper. Various methods are described in the Turk and O'Brien paper [6].

2.2 Shape reconstruction from unorganized dense points

Existing interpolating techniques for unorganized dense points fall into two categories: sculpting-based and region-growing [7] [8]. In sculpting-based methods, a volume tetrahedralization is computed from the data points, typically the 3D Delaunay triangulation. Tetrahedra are then removed from the convex hull to extract the original shape. Region-growing methods start with a seed triangle, consider a new point and join it to the existing region boundary, and continue until all points have been considered. Refer to Bernardini's [7] paper for recent development in this area.

3. Livewire

3.1 Basic livewire concept

The basic working principle of livewire is the following: a user selects a seed point on an image, then freely moves the mouse to other positions on the image. Livewire automatically provides a path from the seed point to the current free point. This path usually falls into the border of regions inside the image, which usually is what a user want and eliminates the need of careful drawing by a user along the boundaries. Since the path changes according to the movement of the free point, it looks the wire is active and therefore, livewire term is coined.

The underneath algorithm finds the boundary definition via dynamic programming and formulates it as a graph searching problem. The goal is to find the optimal path between a start node and a set of goal nodes. The optimality is defined as the minimum cumulative cost path from a start point to a goal point. The cumulative cost of a path is the sum of local edge costs on the path.

3.2 Combination of livewire and free hand drawing

A special design in mouse drawing is developed: when a user goes into a drawing contour mode, the livewire mode is always on. The present invention provides for permitting, at some troublesome area, for a user to drag the mouse (move the mouse when pressing a mouse button) to draw the curve without livewire into action. When the user releases the button, the live wire turns back on. In this way, a user can draw a contour very quickly using a combination of livewire and free-hand drawing without needing to press other GUI buttons to switch the livewire mode on and off.

3.3 Modification based on livewire

Livewire can also be applied to modifying existing contour. Typically a user can take a drawn contour from one slice and overlay it to another slice. Usually, however, the contour will not align very well on the object of interest in the new slice. Besides using some ad hoc techniques to automatically move the contour to the desired position such as active contour models, the present invention provides for applying the same livewire technique here. By clicking a point on the contour and move it to the desired boundary, the neighbor pieces of the contour with respect to the clicked point are acting like two livewires and move according to the movement of the clicked point. By moving just a few of the points along the contour, one can easily move the contour to the desired positions.

3.4 Navigation through dataset

To facilitate the way user input the contour a fast way to navigate through the data set is to let user easily select a view that can expose the maximal information of the region of interest. The present invention provides for the use of a graphical wireframe cube and cutting planes through this cube. An accompanied multiplanar projection image of the cutting plane through the data set is displayed along the side of the cube. By rotating this cube and moving the cutting plane, the user can select an appropriate viewing plane that exposes significant contour/shape features.

4. Shape Reconstruction using Variational Implicit Functions

Turk and O'Brien [6] proposed a shape transformation method using variational implicit functions. Variational Interpolation relies on scattered data interpolation to solve the shape reconstruction problem. The problem of scattered data interpolation itself is to create a smooth function that passes through a given set of data points. The scattered data is spread around in 3D space in general. But in our slice-based surface reconstruction problem, the constraint points are resided on the given contours and a function is found to pass through constraints. If the constraint points are spread around the 3D space, the smooth function forms a 3D shape. An object could be reconstructed by computing the function value of each voxel in the three-dimensional space.

4.1 Turk and O'Brien Algorithm

The following description of the algorithm is based on the Turk and O'Brien paper. Given a collection of k constraint points $\{c_1, c_2, \ldots c_k\}$ that are scattered in the plane, together with scalar height values $\{h_1, h_2, \ldots h_k\}$, construct a smooth surface that matches each of these heights at the given locations).

The desired surface is a function $f(x)$ that minimizes the energy of Equation 1.

$$f(x) = \int_\Omega f_{xx}^2(x) + 2f_{xy}^2(x) + f_{yy}^2(x)$$

Equation 1: Energy Function to Measure Quality of an Interpolation Function

This energy function measures the quality of an interpolating function and then finds the single function that matches the given data points and that minimizes this energy. The scattered data interpolation task is a variational problem where the solution is a function $f(x)$, that will minimize Equation 1. This variational problem was studied by Duchon [9] and can be solved using weighted sums of the radial basis function $\phi(x)=|x|^2 \log(|x|)$. Using the radial basis function the interpolation can be expressed as $$f(x) = \sum_{j=1}^{n} d_j \phi(x - c_j) + P(x)$$

Equation 2: Interpolation Function Using Radial Basis Function

To solve for the set of $d_j$ (weights) that satisfy the interpolation constraints $h_i = f(c_i)$, the right side of Equation 2 is substituted for $f(c_i)$ $$h_i = \sum_{j=1}^{k} d_j \phi(c_i - c_j) + P(c_i)$$

Equation 3: Interpolation Function that Satisfies the Constraints

Because Equation 3 is linear with respect to the unknowns, $d_j$ and the coefficients of $P(x)$, it forms a system of linear equitation. Let $c_i = (c_i^x, c_i^y, c_i^z)$ and $\phi_{ij} = \phi(c_i - c_j)$. This linear system can be written as follows:

$$\begin{bmatrix} \phi_{11} & \phi_{12} & \cdots & \phi_{1k} & 1 & c_1^x & c_1^y & c_1^z \\ \phi_{21} & \phi_{22} & \cdots & \phi_{2k} & 1 & c_2^x & c_2^y & c_2^z \\ \vdots & \vdots & & \vdots & \vdots & \vdots & \vdots & \vdots \\ \phi_{k1} & \phi_{k2} & \cdots & \phi_{kk} & 1 & c_k^x & c_k^y & c_k^z \\ 1 & 1 & \cdots & 1 & 0 & 0 & 0 & 0 \\ c_1^x & c_2^x & \cdots & c_k^x & 0 & 0 & 0 & 0 \\ c_1^y & c_2^y & \cdots & c_k^y & 0 & 0 & 0 & 0 \\ c_1^z & c_2^z & \cdots & c_k^z & 0 & 0 & 0 & 0 \end{bmatrix} \begin{bmatrix} d_1 \\ d_2 \\ \vdots \\ d_k \\ p_0 \\ p_1 \\ p_2 \\ p_3 \end{bmatrix} = \begin{bmatrix} h_1 \\ h_2 \\ \vdots \\ h_k \\ 0 \\ 0 \\ 0 \\ 0 \end{bmatrix}$$

The advantages of Turk's algorithm are the following:
Interpolated objects are very smooth and natural looking.
Algorithm can handle multiply contours from any arbitrary angles.
The object is described by a function that continues even "behind" the given contours.
It is not confined to a specific resolution.

But one main disadvantage of this algorithm is that it requires a very long computation time.

FIG. 3 of the drawings shows the results of interpolation based on variational implicit functions compared to another interpolation scheme using offset curves [10]. It is shown that the result of interpolation using variational implicit function is smoother and natural looking. However, a big disadvantage is the calculation time. To reconstruct the object shown in FIG. 3 in a cube of 100 slices with a width and height of 256 pixels took more than 2 hours using straightforward implementation based on the paper.

4.2 Speed up

The present invention provides ways for speeding up Turk's algorithm so that it can be used in an interactive environment.

4.2.1 Implementation and Code Optimization

The entire interpolation process of the present invention includes two main steps. In the first step, the weights for the interpolation function are calculated by solving a linear system. After the weights are obtained, in the second step, the object is reconstructed in the three-dimensional space by calculating the function value at proper places.

The weights are currently calculated using the LU decomposition algorithm. The complexity of that algorithm is $(N+4)^3$, where N is the number of constraints. Since the system is symmetric and positive semi-definite, faster algorithms like Cholesky Decomposition [11] which is about a factor of two faster, can be used too. Furthermore Bar-On, Codenotti and Leoncini [12] introduced a fast parallel implementation of the Cholesky decomposition.

The square root computation of the square vector length in the radial basis function is eliminated by the present invention as follows:

$$|x|^2 \log(|x|) = |x|^2 \log\left(\sqrt{|x|^2}\right) = \frac{1}{2}|x|^2 \log(|x|^2)$$

The floating-point multiplication by ½ can be moved outside of the summation so it is computed only once for each function evaluation. Since the radial basis function and the function that computes the function value are called frequently, these functions are implemented as inline code. That allows the compiler to do better speed optimizations because the function parameters can be kept in processor registers instead of passing them via the stack memory. These optimizations speeded up the algorithm by about eighty percent.

4.2.2 Reduction of constraint points

The constraints are composed of all points on the given shapes and assign a height value of zero. The norm constraints are all points on one layer interior the given shape with the height value of one assigned. The applicants studied how a reduction of the total number of constraints would affect the output, FIG. 4 of the drawings shows the output of the interpolation with different number of constraints.

Since the problem of scattered data interpolation is to create a smooth surface that matches all constraints at the given height value, even a significant reduction of constraints gives very similar result but at a much shorter computation time. After some experiments by the applicants, it turned out that a constant distance between the constraint points gives the best results. This method of the present invention basically removes all the points that don't have a minimum distance to the previous point in the list.

The present invention provides an approach which allows the user to extract complex three-dimensional objects by giving just minimal input in form of contours (see FIG. 5) Furthermore, the information given by the contours is significantly reduced as described in chapter 4.2.2. to reach interactive algorithm speed. However, the reduction of information can lead to inaccuracy of the reconstructed object that does not match the original data given by the slice-based images exactly (see FIG. 6)

The fact that the reconstructed object differs from the original data is a result of reducing the necessary user interaction and therefore the available input data. However, replacing the standard surface rendering method by a slower volume rendering method will give a more satisfactory output. This is because the volume rendering method applies a transparency value to each voxel, while the surface rendering method only uses a binary flag (part of the object, not part of it). Since the reconstructed object matches the original sliced-based data in general and differs only on the outside, where the transparency values are high, these differences become nearly invisible in volume rendering modes (see FIG. 7)

4.2.3 Surface Reconstruction vs. Solid Reconstruction

Either surface or solid can describe a 3D shape. Surface representation is in the form of triangular or polygonal meshes. It is used mostly for rendering and visualization purposes. On the other hand, solid representation is in the form of voxel volume. It can be used in volume visualization or solid-based editing. Since the original data set is voxel-based in nature, it is easier to do the editing using solid-based operations. Therefore, solid reconstruction is more suitable for editing purposes in medical domains.

A solid 3D shape can be reconstructed directly from the implicit interpolation function by evaluating the function in every voxel of the 3D data set. If the function value is positive, then the voxel belongs to the interior of the 3D shape; otherwise, it is outside of the 3D shape. However, this direct evaluation approach is too time-consuming because the function is needed to be calculated in every voxel and the cost is pretty high. The computation of each function value is based on a summation of terms. The number of terms depends on a large number of constraints (in the order of hundreds). Each term itself consists of vector additions, vector length computation and a certain number of floating point operations including square root and logarithm function.

One way to speed up the reconstruction is to skip voxels that are obviously inside or outside the 3D shape. Instead of using only the binary information that a function value is above or below the zero-level, one could use the height value to determine the need of function evaluation for adjacent cells. When a function value at a specific location is much greater than zero one can assume that the entire region around it is part of the object too. When the function value is much below the zero level, the area around that location does not belong to the interpolated object. This method is demonstrated in FIG. 8 where the function values are computed only in the gray regions. Using this technique of the present invention the total number of computed function values could be reduced by about eighty percent.

Even though the solid reconstruction has been sped up by the above method, it is still too slow to satisfy the requirement of interaction. An alternative is to first use the surface reconstruction and then scan converting it to the solid representation. The scan conversion is also referred as voxelization. This is also a preferable route because the user can check the correctness of the reconstructed object first.

The user can repeat the reconstruction process until a desired shape is obtained and then voxelize this shape to create a solid for editing purposes.

4.2.4 Surface polygonization

Assuming all constraints are part of one single surface, one can scan along the zero-level of the interpolation function in three-dimensional space instead of processing slice by slice. That way it would only be necessary to compute function values along the object surface. Bloomenthal [13] introduced a polygonizer where a polygonal approximation of the 3D surface is created from the implicit surface function (the interpolation function). The method divide the space into cubes and determine the section of the given implicit surface with the edges of the cubes. Another alternative is the Hartmann's marching method for the triangulation of the surfaces. Depending on the size of generated polygons, only a fraction of voxels along the surface is computed as shown in FIG. 9.

The output of the polygonizer allows for a fast rendering of the surface with common polygon rendering tools like Open GL.

4.3 Voxelization

After the surface representation of a 3D shape is obtained, an additional step of conversion is necessary to allow operations on solid volume data set. Kaufman studied the problem of converting geometric objects into their discrete voxel-map and introduced a fast 3D scan-conversion algorithm. Chen and Fang [17] introduced a fast voxelization implementation using existing graphic systems. In the application of the present invention, the 3D shape can be sliced into 2D contours along the Z direction with the same resolution as the original data set. These 2D contours can then be filled using simple 2D scan filling algorithm. The final 3D solid is composed of a stack of filled 2D regions.

5. Technique Demonstrations

All three basic steps of conversions are demonstrated in retrieved (FIG. 10B) from the original scanned data (FIG. 10A). This can be done by contour detection or just by letting the user draw contours manually. The prototype of the present invention allows the user to add contours using the Livewire drawing method. Then a polygon approximation of the object surface is constructed (FIG. 10C). The polyhedron is also rendered in a preview window to give the user feedback about how many contours are needed for the interpolation. The information represented by the polyhedron is then converted back into their discrete voxel-map to make it applicable (e.g. removing or adding data, FIG. 6D). The extraction of a hip joint in this example of the present invention is done in less than a minute. This procedure usually takes more than 20 minutes when doing slice by slice extraction.

The results of using Bloomenthal polygonizer together with the interpolation based on variational implicit functions regarding computation times are presented in FIG. 11. As shown the total computation time using a couple of hundred constraints is less than 5 seconds. This makes the method and system of the present invention usable in an interactive environment. The total elapsed time depends on the number of constraint points as well on the size of the triangles. Reducing the number of constraints as well as increasing the size of the triangles causes significant speedups that are useful for realizing a preview mode.

Figure 13B:
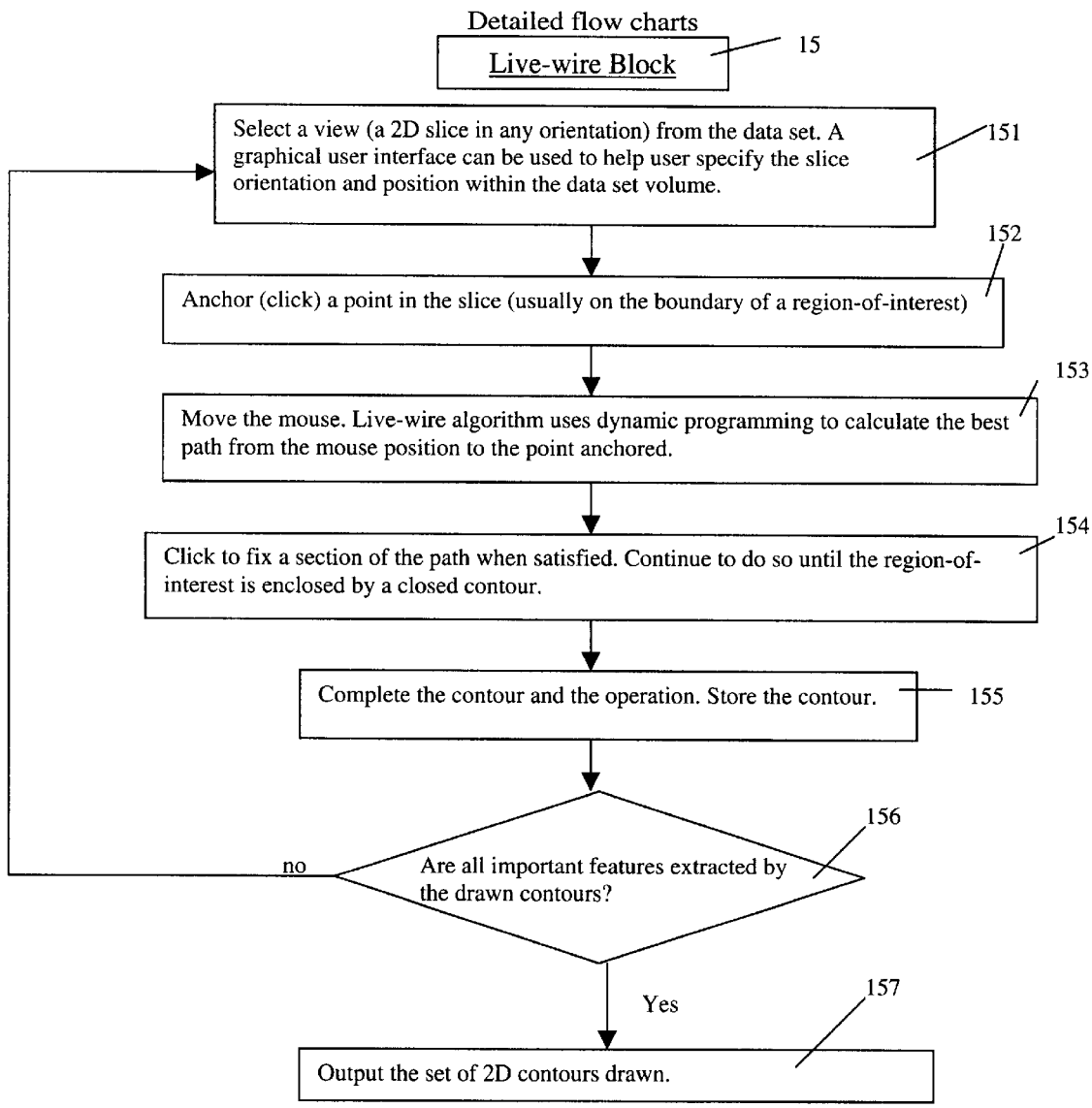

The system operates as illustrated in the general flow chart of FIG. 13A and the detailed flow charts of FIGS. 13BA–13E.

A data set (10) such as a stack of two dimensional medical scan slices are provided as shown in FIG. 13A.

Two dimensional contours are then drawn (15) of the pertinent areas of interest from the data set (10) e.g. the salient areas of interest such as body organs, bone area, etc. using livewire techniques. The livewire techniques are described in detailed flow chart FIG. 13B. A view is selected from the data set (10) as shown in block 151. A graphical interface assists the user in specifying the slice orientation and position within the data set.

Graphical user interfaces are described in sections 3.2 3.3 and 3.4 of this application. The combination of livewire and freehand drawing technique is described in section 3.2 of the present application as on such interface.

The modification when overlaying a slice on another slice clicking appoint on the desired contour and moving it to the desired boundary is another interface technique described in section 3.3 of the present application.

The user can also utilize a graphical wire frame cube and cutting planes through the cube as described in section 3.3 of the present application in order to permit the user to select an appropriate viewing plane that exposes the maximum information of the region of interest by rotating the cube and moving the cutting plane.

After a view is elected in step 151, a point is selected in the slice usually on the boundary of the region of interest (152).

The mouse is then moved and the live wire algorithm determines the best path from the mouse position to the point clicked as shown in block 154.

The user then clicks the mouse to fix a section of the path when satisfied and this is continued until the region of interest is enclosed by a closed contour (block 154).

The contour is then completed and stored (block 155).

If all the salient features have been extracted (block 156) then the drawn contour are outputted (block 157) if not then the present invention returns to block 151 and repeats the aforementioned steps in FIG. 13B.

Block 20 of FIG. 13A describes sub-sampling the contour points which includes also reducing the number of contour points as was described in section 4.2.2. This helps to speed up the process for obtaining a 3D image.

Surface reconstruction (block 35) is described in detail in section 4, 4.1, and 4.2.1 and illustrated in detail in FIG. 13C. (blocks 351,352, and 353).

After surface reconstruction (25) the surface is approximated with polygonal patches (30) as described in section 4.2.3 and 4.2.4. The steps are illustrated in FIG. 13D.

Figure 13D:
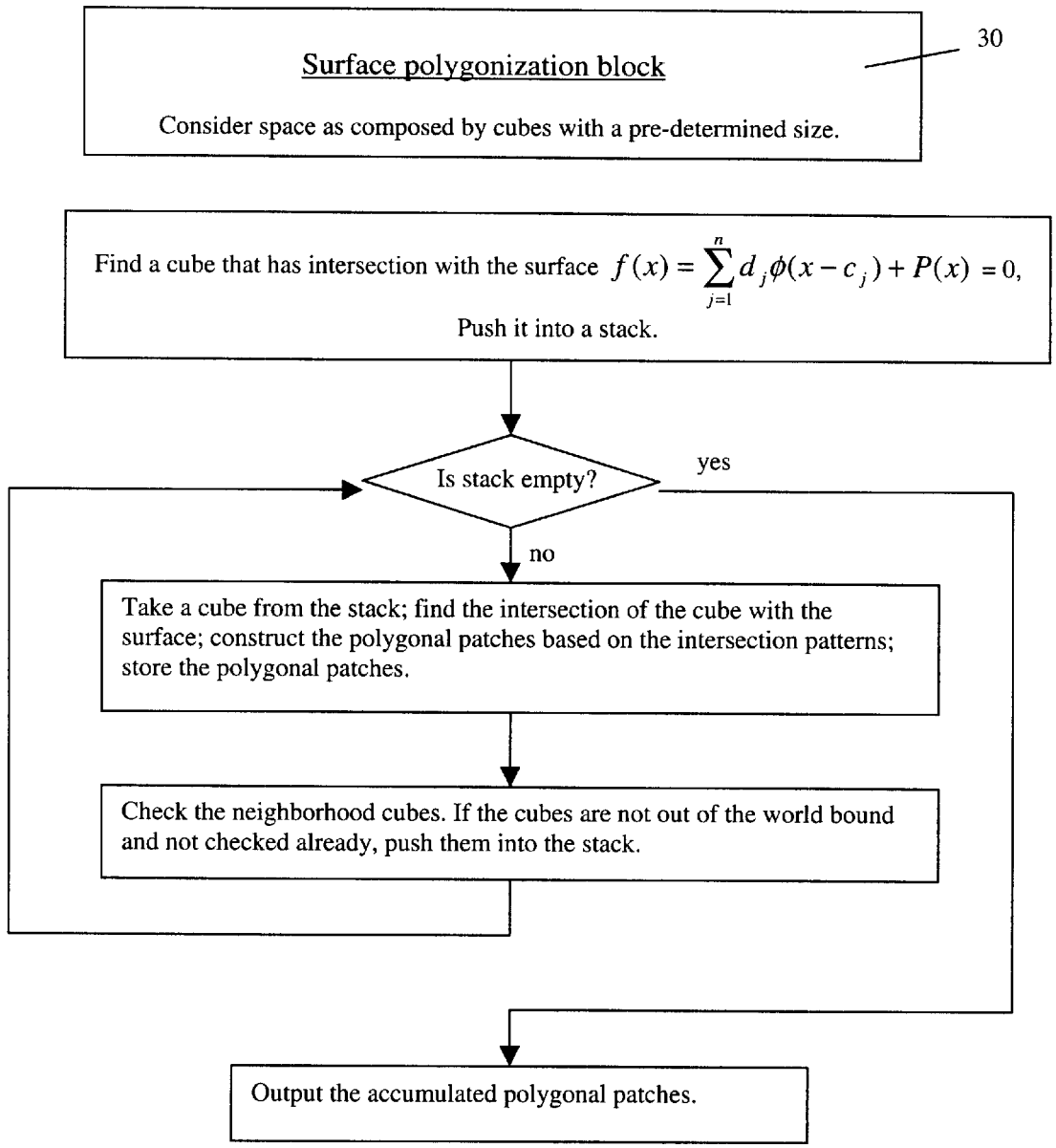
Figure 13E:
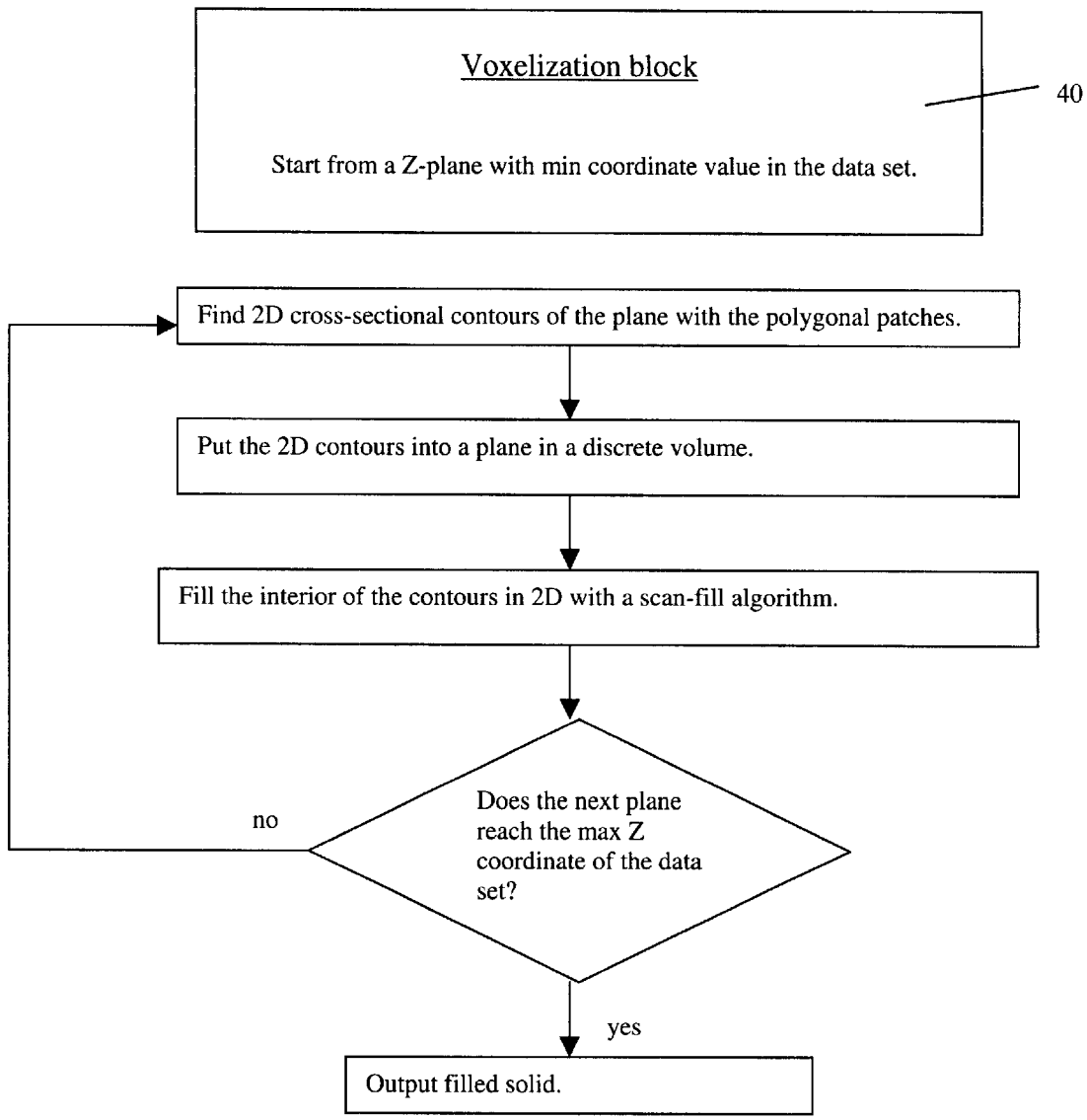

If the image is to be modified then voxelization (40) is necessary for removing an obscuring portion and filling in the interior or to fill in the interior of the image even if not obscured as shown in FIG. 13D and described in section 4.3. The image is then displayed (45) or used as a mask (50) to constrain the data set. (FIG. 13A).

A system according to invention principles provides for shape reconstruction based on variational interpolation functions which can be implemented to achieve the interactive speed. Together with semi-automatic delineation tool such as livewire, user can extract a difficult 3D region of interest from a data set in a very short time. This kind of quick interactive time is crucial for the success of an editing tool.

The breakthrough was reached by operating on different data formats. First, an interpolation function is calculated by solving the scattered data problem. A polygon approximation of the surface is constructed next. This surface can be rendered and displayed, but voxelization is necessary to make it applicable to the original data set. Also from our experiments, it couldn't be done at interactive speed to modify the data set using the interpolation function directly.

The interpolation scheme has the following features:
Interpolated object is represented by an implicit function,
Handle branching problem elegantly,
Handle contours from arbitrary angles, and
Interpolation in any dimension.

Being able to interpolate between multiple contours allows the method to handle branches without special treating as depicted in FIG. 12A. This is especially useful for reconstructing tree-like structures such as bronchial trees in the application of virtual endoscopy. Another possible application is that it allows infinitive zoom into the vessels without getting artifact appearance due to the representation of the interpolated object by an implicit function.

Most of the interpolation methods are limited for use of parallel contours. This approach opens new field of usage for allowing shapes in arbitrary angles {FIG. 12-B). So it is possible to construct a vessel using two ends of the vessel and a central curve given by the user.

This technique can be combined with other visualization tools so that users can easily explore their data. The reconstructed 3D shape can be used in many applications. For editing, it can be used for removing parts from a data set where volume growing fails (the undesired region is connected to regions of interest). It can be used for reconnecting broken vessels. For visualizing, it can used as attribute masking in volume visualization or as model to be navigated in fly-through application.

The system permits a part to be added between two separated pieces as follows:

(1) The user draws a connection line indicating the separate pieces to be connected. Two cross sectional contours are extracted according to the user's input automatically.

(2) The software creates a 3D piece based on the algorithm and the two extracted contours. This 3D shape is then put in between the two separated pieces and made into a whole.

(3) If the shape is not satisfactory, the user can modify the 3D shape by putting in more constraints (adding contours) or changing the shapes of 2D contours.

The present invention permits a new part to be added as follows:

(1) The user draws a few outline contours to roughly describe the shape.

(2) The software reconstructs a 3D shape.

(3) The user can place the 3D shape to a desired pace in a data set.

The system may also be employed to produce a special rendering mask in volume visualization . Thus if the user desires to highlight the femur bone as in the data set of the co-applicant, Dr. Moller's thesis, but still wishes to see its inner structure and its relationship with the neighborhood then the user can render the whole data set as normal visual volumization except for the voxels of the femur bone which can be rendered or depicted with a special reddish tone since the user has the 3D shape of the bone.

These applications require easy user interface for the user to manipulate and navigate through step by step however the underlying algorithms are in place as described herein.

While certain embodiments have been shown and described, it is distinctly understood that the invention is not limited thereto but may be otherwise embodied within the scope of the appended claims.

References

[1] David Meyers and S. Skinner, "Surfaces from contours," ACM Trans. On Graphics, Vol.11, No.3, pp.228–258, July, 1992.

[2] Mortenson, E. N. and W. A. Barrett, "Image segmentation with intelligent scissors," Graphical Models and Image Processing, Vol.60, No.5, pp.349–384, September 1998.

[3] Fujimura, K. and E. Kuo, "Shape reconstruction from contours using isotopic deformation," Graphical Models and Image Processing, Vol. 61, pp.127–147, 1999.

[4] J-D. Boissonat, "Shape reconstruction from planar cross-sections," Computer Vision, Graphics, Image Processing, 44(1), 1988, 1–29.

[5] W. -C. Lin, C. -C. Liang, and C. -T. Chen, "Dynamic elastic interpolation for 3D medical image reconstruction from serial cross sections," IEEE Trans. Medical Imaging, Vol.7, No.3, pp.225–232, 1988.

[6] Turk and O'Brien, "Shape Transformation Using Variational Implicit Functions," *The proceedings of ACM SIGGRAPH* 99, Los Angeles, Calif., August 8–13, pp. 335–342.

[7] F. Bernardini, J.Mittleman et.al., "The ball-pivoting algorithms for surface reconstruction," IEEE Trans. Visualization and Computer Graphics, Vol.5, No.4 349–359, 1999.

[8] H. Edelsbrunner and E. P. Mucke, "Three-dimensional Alpha shapes," ACM Trans. Graph., Vol.13 No.1, pp.43–72, January 1994.

[9] Duchon, Jean, "Splines minimizing rotation-invariant Semi-norms in Sobolev spaces," in Constructive Theory of Functions of Several Variables, Lecture Notes in Mathematics, edited by A. Dolb and B. Eckmann, Springer-Verlag, 1977, pp.85–100.

[10] Mikheev, Nozik and Rubinstein, "Computation of Offset Curves by the Huygens Principle," *Computer Graphics forum*, Vol. 13 (1994), No. 4, pp. 249–252.

[11] Flannery, Press, Teukolsky and Vetterling "Numerical Recipes in C," Cambridge University Press.

[12] Bar-On, Codenotti and Leoncini, "A Fast Parallel Cholesky Decomposition Algorithm," *SIAM Journal on Matrix Analysis and Applications*, Vol. 18, No. 2, 1997, pp. 403–418.

[13] Bloomenthal, "An Implicit Surface Polygonizer," *Graphic Gems IV*, edited by Heckbert, Academic Press, 1994, pp. 324–349.

[14] E. Hartmann, "A marching method for the triangulation of surfaces," The Visual Computer, 14:95–109, 1998.

[15] Neider, Davis and Woo, "OpenGL Programming Guide", Addison Wesley.

[16] Kaufman, "3D Scan-Conversion Algorithms for Voxel-Based Graphics," *Interactive 3D Graphics*, Oct. 23–24, 1986, pp. 45–75.

[17] Chen and Fang, "Fast Voxelization of Three-Dimensional Synthetic Objects," *Journal of Graphics Tools*, 1998, Vol. 3, No. 4, pp. 33–45.

What is claimed is:

1. A method for reconstructing shapes in a three dimensional set of image data, the steps comprising:

(a) using a data set of two dimensional images to provide a displayed image wherein at least one image of the set is non-parallel to at least one other image of the set;

(b) applying indications on the displayed image;

(c) developing a surface reconstruction from said indications of the displayed image;

(d) polygonizing the surface reconstruction of the displayed image;

(e) using the polygonized surface of the displayed image to develop the displayed image into a reconstructed shape; and (f) displaying the reconstructed shape.

2. The method according to claim 1 wherein prior to step (f), the polygonized surface reconstruction of the displayed image is filled in an interior area using voxelization to obtain a solid three dimensional image of said reconstructed surface and said solid three dimensional image is then displayed as the reconstructed shape.

3. The method according to claim 2 wherein said polygonized surface identifies data representative of an obscuring portion of the displayed image and a subtracted data set representative of the obscuring portion is developed so that the obscured portion can be removed and the rest of the displayed image visualized.

4. The method according to claim 3 wherein said rest of the displayed portion is visualized on a display by laying said polygonal patches into a discrete volumetric grid and filling in an interior area of said reconstructed surface using voxelization thereby obtaining a solid three dimensional image of said reconstructed surface.

5. The method according to claim 1 wherein said data set comprises at least one stack of two dimensional image scan slices having salient features and at least one slice of the stack is non-parallel to at least one other slice of the stack.

6. The method according to claim 1 wherein said developing step (c) includes reconstructing a surface image using subsampled contour points of said data set and a variational implicit function to obtain a set of parameters that describe a three dimensional shape of said reconstructed surface image.

7. The method according to claim 6 wherein said reconstruction is sped up by reducing the number of contour points selected for subsampling.

8. The method according to claim 7 wherein the steps of claim 1 are repeated to obtain a better approximate three dimensional image by increasing the number of contour points selected for subsampling, the contour points being selectable from slices that are non-parallel to other slices having selected contour points.

9. The method according to claim 1 wherein said surface reconstruction of the displayed image in step (d) is approximated utilizing polygonal patches.

10. The method according to claim 1 wherein said solid three dimensional image is displayed as a solid.

11. The method according to claim 1 wherein said solid three dimensional image obtained is used as a mask to constrain a data set.

12. The method according to claim 1 wherein said solid three dimensional image obtained is used as a mask, the method further comprising:

using the mask to remove the data set overlapped by the mask; and after removing the portion of the data set occupied by the mask, revealing the area of the data set that is outside of the mask but obscured by the mask.

13. A method for reconstructing shapes in a three dimensional set of image data, the steps comprising:

(a) using a data set of two dimensional images to provide a displayed image;

(b) applying indications on the displayed image and drawing two dimensional contours from two dimensional image scan slices utilizing livewire techniques;

(c) developing a surface reconstruction from said indications of the displayed image;

(d) polygonizing the surface reconstruction of the displayed image;

(e) using the polygonized surface of the displayed image to develop the displayed image into a reconstructed shape; and (f) displaying the reconstructed shape.

14. The method according to claim 13 wherein said livewire techniques include switching between livewire drawing and freehand drawing by a user with a switching mechanism permitting a user to draw a troublesome portion of a contour by freehand and returning to live wire drawing when desired.

15. The method according to claim 14 wherein the switching mechanism is disposed relative to a mouse device.

16. The method according to claim 13 wherein said livewire technique includes overlaying one scan slice with another scan slice and clicking a point on a contour to move it to a desired location in order for all neighboring pieces to be moved into registration when said slices are aligned well on an area of interest in said slices.

17. The method according to claim 13 wherein said livewire technique includes inputting a contour by using a graphical wireframe cube and cutting planes through said cube so that an accompanied multiplanar projection image of the culling plane through said data set is displayed along side said cube and that by rotating said cube and moving said cutting plane an appropriate viewing plane can be selected that provides a significant contour and shape features of an area of interest.

18. A system for reconstructing shapes in a three dimensional set of image data, comprising:

(a) a data set of two dimensional images to provide a displayed image wherein at least one image of the set is non-parallel to at least one other image of the set;

(b) means for applying indications on the displayed image;

(c) means for developing a surface reconstruction from said indications of the displayed image;

(d) means for polygonizing the surface reconstruction of the displayed image;

(e) means for developing the displayed image into a reconstructed shape using the polygonized surface of the displayed image; and (f) means for displaying the reconstructed shape.

19. The system according to claim 18, further comprising voxelization means for obtaining a solid three dimensional image of said reconstructed surface prior to displaying the reconstructed shape by filling the polygonized surface reconstruction of the displayed image in an interior area and then displaying said solid three dimensional image as the reconstructed shape.

20. The system according to claim 19 wherein said polygonized surface identifies data representative of an obscuring portion of the displayed image and a subtracted data set representative of the obscuring portion is developed so that the obscured portion can be removed and the rest of the displayed image visualized.

21. The system according to claim 20 wherein said rest of the displayed portion is visualized on a display by laying said polygonal patches into a discrete volumetric grid and filling in an interior area of said reconstructed surface using voxelization to thereby obtain the solid three dimensional image of said reconstructed surface.

22. The system according to claim 19 wherein said solid three dimensional image obtained is displayed as a solid.

23. The system according to claim 19 wherein said solid three dimensional image obtained is used as a mask to constrain a data set.

24. The system according to claim 19 wherein said solid three dimensional image obtained is used as a mask, the method further comprising:

using the mask to remove the data set overlapped by the mask; and after removing the portion of the data set occupied by the mask, revealing the area of the data set that is outside of the mask but obscured by the mask.

25. The system according to claim 18 wherein said data set comprises at least one stack of two dimensional image scan slices having salient features and at least one slice of the stack is non-parallel to at least one other slice of the stack.

26. The system according to claim 18 wherein said means for developing includes reconstructing a surface image using subsampled contour points of said data set and a variational implicit function to obtain a set of parameters that describe a three dimensional shape of said reconstructed surface image.

27. The system according to claim 18 wherein said reconstruction is sped up by reducing the number of contour points selected for subsampling.

28. The system according to claim 18 further comprising repetition means for obtaining a better approximate three dimensional image by increasing the number of contour points selected for subsampling.

29. The system according to claim 18 wherein said surface reconstruction of the displayed image is approximated utilizing polygonal patches.

30. A system for reconstructing shapes in a three dimensional set of image data, comprising:

(a) a data set of two dimensional images to provide a displayed image;

(b) means for applying indications on the displayed image wherein said means for applying includes drawing the two dimensional contours from two dimensional image scan slices utilizing livewire techniques;

(c) means for developing a surface reconstruction from said indications of the displayed image;

(d) means for polygonizing the surface reconstruction of the displayed image;

(e) means for developing the displayed image into a reconstructed shape using the polygonized surface of the displayed image; and (f) means for displaying the reconstructed shape.

31. The system according to claim 30 wherein said livewire techniques are provided by a means for switching between a livewire drawing and a freehand drawing by a user with a switching mechanism for permitting a user to draw a troublesome portion of a contour by freehand and returning to the livewire drawing when desired.

32. The system according to claim 31, further comprising a mouse device disposed relative to the switching mechanism.

33. The system according to claim 30 wherein said livewire techniques includes overlaying one scan slice with another scan slice and clicking a point on a contour to move it to a desired location in order for all neighboring pieces to be moved into registration when said slices are aligned well on an area of interest in said slices.

34. The system according to claim 30 wherein said livewire techniques includes providing a graphical wireframe cube and cutting planes through said cube to input a contour so that an accompanied multiplanar projection image of the cutting plane through said data set is displayed along side said cube and that by rotating said cube and moving said cutting plane an appropriate viewing plane can be selected that provides a significant contour and shape features of an area of interest.

* * * * *